UNITED STATES PATENT OFFICE.

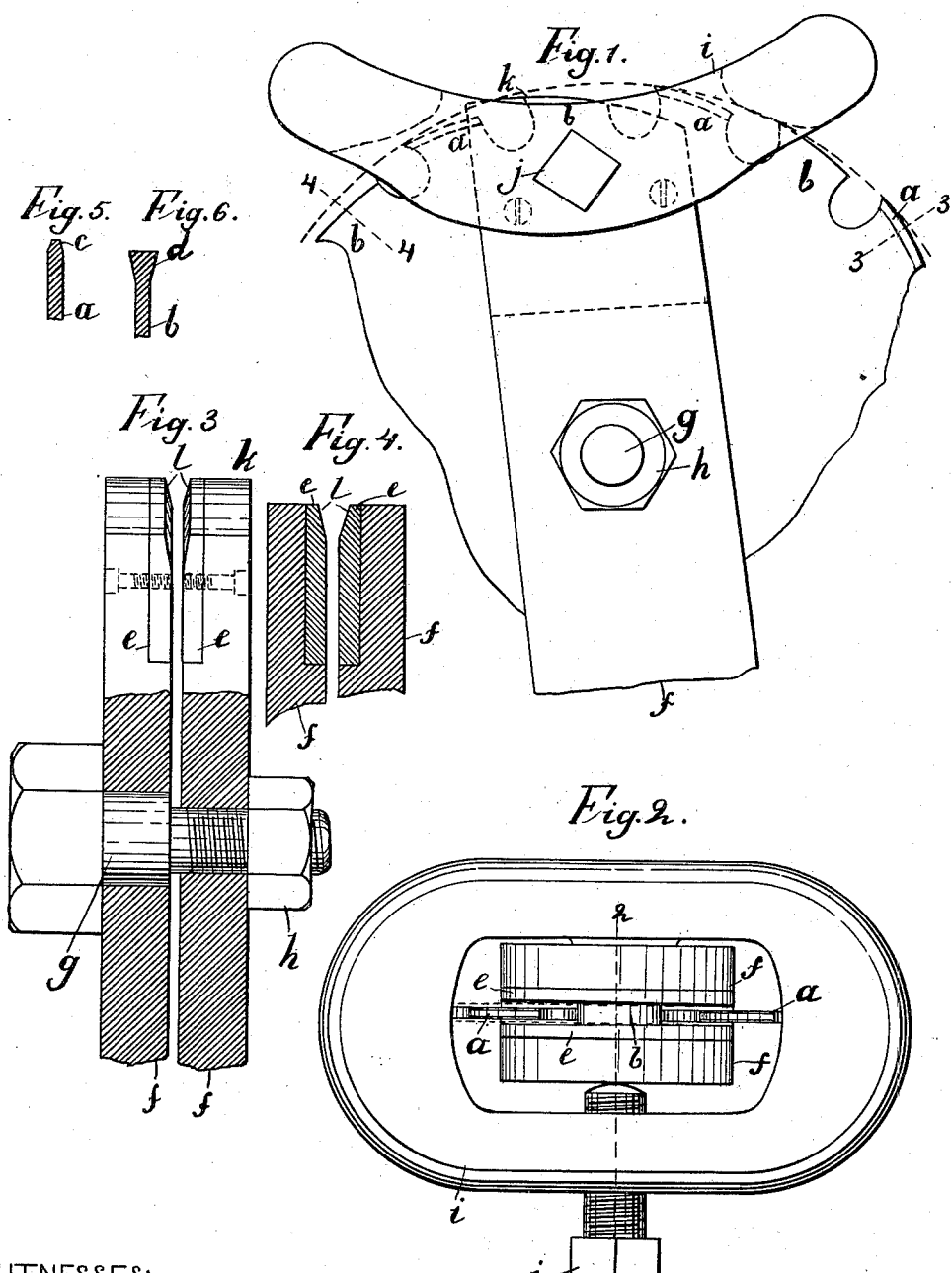

FRANK W. WALQUIST, GULBRAND NELSON, AND JOHN L. GRONQUIST, OF NEW YORK, N. Y.

APPARATUS FOR SHAPING SAW-TEETH.

SPECIFICATION forming part of Letters Patent No. 639,472, dated December 19, 1899.

Application filed February 15, 1897. Renewed May 13, 1899. Serial No. 716,706. (No model.)

*To all whom it may concern:*

Be it known that we, FRANK W. WALQUIST, GULBRAND NELSON, and JOHN L. GRONQUIST, citizens of the United States, residing at New York, (Brooklyn,) in the county of Kings and State of New York, have invented certain new and useful Improvements in Apparatus for Shaping Saw-Teeth; and we do hereby declare the following to be a full, clear, and exact description of the invention, such as will enable others skilled in the art to which it appertains to make and use the same.

Our invention relates to saws provided with teeth having an upset outer face of considerable length from the cutting-point backward to the clearance-notch in advance of the succeeding teeth and expanded equally on both sides; and it consists in apparatus for shaping such teeth, as hereinafter described, reference being made to the accompanying drawings, in which—

Figure 1 is a side elevation of part of a saw of the kind to which our invention applies and the apparatus employed in shaping the teeth of the kind as stated. Fig. 2 is a plan view of the parts represented in Fig. 1. Fig. 3 is partly a front elevation and partly a sectional elevation of part of the apparatus of Figs. 1 and 2. Fig. 4 is a vertical section of the parts represented in Fig. 3, taken on line 2 2, Fig. 2. Fig. 5 is a transverse section through one of the teeth of the saw on line 3 3, Fig. 1. Fig. 6 is a section through another of the teeth of the saw on line 4 4, Fig. 1.

The saw has two different forms of teeth $a$ and $b$ in alternate arrangement, the teeth $a$ being as much larger in radial projection than teeth $b$ as the advance of the work on the saw per tooth or a little more and having taper sides, as shown in Fig. 5, and teeth $b$ being expanded sidewise each way, as shown in Fig. 6.

The teeth $a$ are designed to cut narrow channels in advance of teeth $b$ no wider than said teeth $a$, which serve to guide teeth $b$ and steady them against lateral play; also to facilitate clearance of the cuttings of teeth $b$ and lessen the resistance of them.

Teeth $a$ and $b$ have clearance on their outer faces $c$ and $d$ proportionate to the advance of the work. The taper sides of teeth $a$ are produced by milling or grinding them in any approved way; but for expanding the sides of teeth $b$ we provide a pair of hardened-steel dies $e$, mounted in a pair of clamping-jaws $f$, fitted to a pivot-bolt $g$, inserted in the center hole of the saw and having a clamping-nut $h$, and with this clamp we provide another clamp consisting of the yoke $i$ and a set-screw $j$, adapted to embrace the outer ends of jaws $f$ and clamp them hard against the saw-plate close to the roots of the teeth $b$, said yoke being a comparatively flat plate with an opening through it adapted to receive the ends of the jaws in it, so as to afford access to a tooth $b$, clamped between the dies, for hammering the outer face $d$ while so clamped.

The outer ends of the jaws $f$ and of the dies $e$ are in this case formed on the eccentric curve $k$; but it may be a straight line for gaging the clearance of the outer face $d$, and the die-faces $l$ are shaped according to the required expansion of the sides of the teeth $b$, so that teeth $b$, having, to begin with, about the same radial extension as teeth $a$, or more, if necessary, and then being upset on the faces $d$ with a hammer or other swaging device, will be expanded within the dies to the extent required and in exact regularity of form and relation to each other, thus making very smooth-cutting saws. If there is any excess of metal after the die-cavity is filled by expansion of the sides, it may be filed or ground off true to the required limit.

It will be seen that owing to the fixed relation of the teeth to the axis of the clamping-dies, the movable relation of the jaws thereto, and the eccentric ends of the jaws also, the dies may be gaged relatively to the teeth by advancing or reversing them for some variation of the radial projection of the teeth when finished. For this purpose also the jaws $f$ may be adjustable lengthwise on the center pivot. It will also be seen in Fig. 2 that the die-cavity is a little wider forward relatively to the teeth and tapers backward to so shape the outer faces of the expanded teeth, but the sides of the teeth are to be finished by grinding after upsetting and may be so tapered in the grinding process.

We are aware that clamping-dies and a hammer-die have been used for upsetting the cutting-points of the teeth preparatory to reshaping the teeth, and we do not claim such dies broadly. The dies which we claim are specially adapted for expanding the elongated outer faces of the teeth extending from point to heel in eccentric relation to the axis of the saw, affording clearance for advance of the work along the saw and determining the radial and lateral limits of the points until worn away the entire length of said faces. This service demands that the dies shall clamp the saw between the teeth and the center with great power to prevent backing the saw.

We claim—

1. In saw-tooth-expanding apparatus, the combination of a pair of clamping-jaws having a center pivot adapted for clamping them together through the center hole of the saw, and clamping the saw-plate between the center and the tooth being expanded, dies in the extremities of said jaws having faces gaged for the required clearance of the outer faces of the saw-teeth, and die-cavities in the clamping sides for receiving the sides of the teeth thereinto the entire length of the teeth from point to heel by upsetting the outer faces of the teeth substantially as described.

2. In saw-tooth-expanding apparatus, the combination of a pair of clamping-jaws having a center pivot adapted for clamping them together through the center hole of the saw, and clamping the saw-plate between the center and the tooth being expanded, dies in the extremities of said jaws having faces gaged for the required clearance of the outer faces of the saw-teeth, and die-cavities in the clamping sides for receiving the sides of the teeth thereinto the entire length of the teeth from point to heel by upsetting the outer faces of the teeth, and a yoke-clamp for the outer ends of the jaws, substantially as described.

In testimony whereof we affix our signatures in presence of two witnesses.

FRANK W. WALQUIST.
GULBRAND NELSON.
JOHN L. GRONQUIST.

Witnesses:
W. J. MORGAN,
A. P. THAYER.